United States Patent
Timken et al.

(10) Patent No.: US 10,052,510 B2
(45) Date of Patent: Aug. 21, 2018

(54) SAFE UNLOADING AND DISPOSAL OF IONIC LIQUID CATALYST CONTAMINATED SPENT SOLIDS

(71) Applicants: Hye Kyung Cho Timken, Albany, CA (US); Jeff William Johns, Draper, UT (US); Thomas Van Harris, Benicia, CA (US)

(72) Inventors: Hye Kyung Cho Timken, Albany, CA (US); Jeff William Johns, Draper, UT (US); Thomas Van Harris, Benicia, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 321 days.

(21) Appl. No.: 14/723,113

(22) Filed: May 27, 2015

(65) Prior Publication Data

US 2016/0346816 A1    Dec. 1, 2016

(51) Int. Cl.
    *A62D 3/30*      (2007.01)
    *C22B 7/00*      (2006.01)
    *C22B 3/00*      (2006.01)

(52) U.S. Cl.
CPC ............... *A62D 3/30* (2013.01); *C22B 7/009* (2013.01); *C22B 11/046* (2013.01); *C22B 11/048* (2013.01); *Y02P 10/214* (2015.11)

(58) Field of Classification Search
CPC ....... A62D 3/30; C22B 11/048; C22B 11/046; C22B 7/009; C22B 7/00; Y02P 10/214; B09B 1/00; B01J 19/00; G21C 19/32
See application file for complete search history.

(56) References Cited

U.S. PATENT DOCUMENTS

| | | | |
|---|---|---|---|
| 4,153,534 A * | 5/1979 | Vasalos | B01J 29/061 208/120.05 |
| 6,049,021 A | 4/2000 | Getman et al. | |
| 8,673,800 B2 | 3/2014 | Timken et al. | |
| 2007/0133731 A1 | 6/2007 | Fawcell et al. | |
| 2011/0105770 A1* | 5/2011 | Liu | C07D 307/46 549/490 |
| 2012/0088949 A1 | 4/2012 | Hussey et al. | |
| 2012/0307953 A1 | 12/2012 | Stevenson | |
| 2013/0209324 A1 | 8/2013 | Timken et al. | |
| 2014/0350321 A1 | 11/2014 | Timken et al. | |
| 2015/0036779 A1 | 2/2015 | Leblanc | |
| 2016/0115566 A1* | 4/2016 | Bhaduri | B01J 19/18 423/22 |
| 2016/0168058 A1* | 6/2016 | Detrick | C07C 7/12 585/331 |

* cited by examiner

*Primary Examiner* — Jennifer A Smith
(74) *Attorney, Agent, or Firm* — Susan M. Abernathy

(57) ABSTRACT

Processes for shutting down a regeneration reactor and for removing spent solid from the regeneration reactor may comprise shutting off a feed comprising an ionic liquid to the regeneration reactor, cooling the regeneration reactor, removing at least a portion of the ionic liquid from the regeneration reactor, purging the regeneration reactor with $N_2$ gas, introducing water into the regeneration reactor to form an acidic liquid in the regeneration reactor, and dumping the acidic liquid and the spent solid from the regeneration reactor. The acidic liquid may be neutralized with a basic liquid to provide a neutralized liquid. The spent solid may be separated from the neutralized liquid. In an embodiment, noble metal(s) may be recovered from the spent solid.

20 Claims, 3 Drawing Sheets

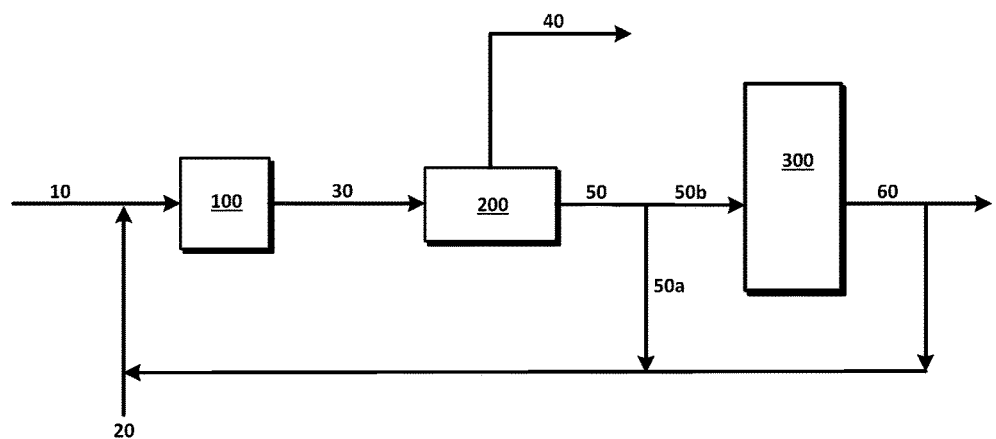
FIG. 1
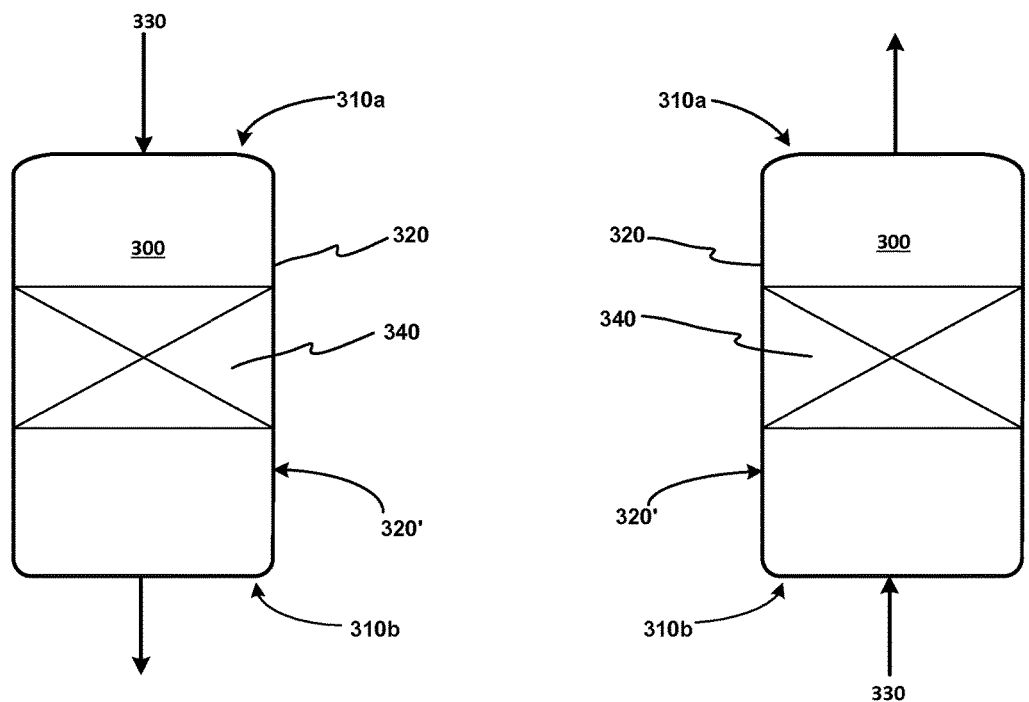
FIG. 2A  FIG. 2B

SAFE UNLOADING AND DISPOSAL OF IONIC LIQUID CATALYST CONTAMINATED SPENT SOLIDS

TECHNICAL FIELD

This disclosure relates to safe unloading and disposal of spent solids contaminated with ionic liquid catalyst.

BACKGROUND

Reactors containing spent solids (e.g., solid catalyst or solid adsorbent) must be shutdown periodically to conduct maintenance and/or to change the spent material. Unit shutdown procedures must be developed and executed with excellence to protect personnel, prevent incidents, and to minimize costs and duration.

There is a need for reactor shutdown processes that can be conducted with maximum efficiency and minimum duration while safeguarding personnel and equipment.

SUMMARY

In an embodiment there is provided a process for safely unloading spent solid from a reactor, the process comprising introducing water into the reactor, wherein the reactor contains the spent solid and the spent solid contains residual ionic liquid; contacting the residual ionic liquid with the water to form an acidic liquid in the reactor; and dumping the spent solid and the acidic liquid from the reactor.

In another embodiment there is provided a process for safely unloading spent solid from a reactor, the process comprising cooling the reactor, wherein the reactor contains the spent solid and an ionic liquid; removing at least a first portion of the ionic liquid from the reactor; purging the reactor with $N_2$ gas; introducing water into the reactor, wherein the spent solid contains residual ionic liquid and the water contacts the residual ionic liquid to form an acidic liquid in the reactor; dumping the spent solid and the acidic liquid from the reactor; neutralizing the dumped acidic liquid to provide a neutralized liquid; and separating the spent solid from the neutralized liquid, wherein the ionic liquid comprises a chloroaluminate ionic liquid catalyst, and the spent solid comprises a solid adsorbent or a solid catalyst.

In a further embodiment there is provided a process for safely unloading spent solid from a reactor, the process comprising cooling the reactor with circulating fluid, wherein the reactor contains the spent solid and free ionic liquid; after cooling the reactor, draining the free ionic liquid from the reactor; after draining free ionic liquid from the reactor, stripping adsorbed ionic liquid from the spent solid; purging the reactor with $N_2$ gas, wherein after purging the reactor the spent solid contains residual ionic liquid; after purging the reactor, flooding the reactor with water; via the flooding step, contacting the residual ionic liquid with the water to form an acidic liquid in the reactor; recirculating the acidic liquid through the reactor; after recirculating the acidic liquid, dumping the spent solid and the acidic liquid from the reactor into NaOH solution to provide a neutralized liquid in admixture with the spent solid; and separating the spent solid from the neutralized liquid.

In another embodiment, there is provided a process for safely unloading spent solid from a reactor, wherein the reactor comprises a vessel containing a bed of a solid adsorbent. The bed of solid adsorbent may serve to trap or otherwise remove impurities from used ionic liquid catalyst so as to purify, reactivate, or regenerate the ionic liquid catalyst. Such impurities removed by the solid adsorbent may include, without limitation, corrosion products, metal scales, coke deposits, and the like. In an embodiment, such a vessel containing a bed of solid adsorbent may also be referred to as a "reactor" as defined herein, even though the bed of solid adsorbent may function primarily as a filtration medium. In an embodiment, a "reactor" as defined herein may comprise a first vessel containing a bed of solid adsorbent in combination with (e.g., upstream from) a second vessel containing a bed of solid catalyst.

Further embodiments of processes for reactor shutdown and for removing spent, contaminated material from the reactor are described hereinbelow. As used herein, the terms "comprising" and "comprises" mean the inclusion of named elements or steps that are identified following those terms, but not necessarily excluding other unnamed elements or steps.

BRIEF DESCRIPTION OF THE DRAWINGS

FIG. 1 schematically represents a regeneration reactor in relation to an ionic liquid catalyzed hydrocarbon conversion process, according to an embodiment of the invention;

FIGS. 2A and 2B schematically represent fluid flow through a regeneration reactor during various phases of a regeneration reactor shutdown process, according to embodiments of the invention;

DETAILED DESCRIPTION

Figure 3A:
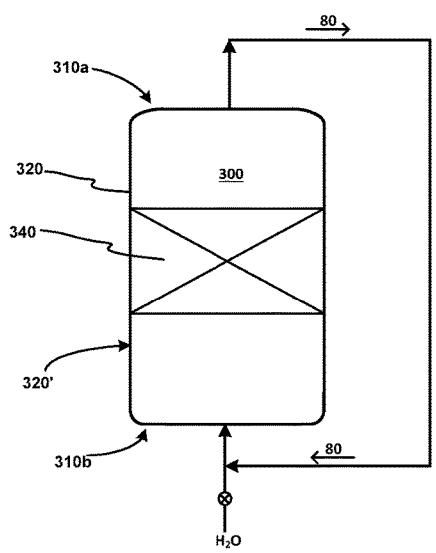
FIGS. 3A and 3B schematically represent the introduction of water into a regeneration reactor during a regeneration reactor shutdown process, according to embodiments of the invention.

Reactor shutdown processes must be done safely to protect personnel yet quickly to minimize lost production. After extended use a regeneration reactor for regenerating used ionic liquid may contain a spent solid contaminated with the ionic liquid. Spent solid that is contaminated with ionic liquid may evolve HCl (gas) upon exposure to moisture, e.g., due to reaction of the ionic liquid with water vapor in the atmosphere. Due to the relatively large volumes of spent solid involved in commercial hydrocarbon processing, inappropriate handling of the spent solid poses a potential threat to personnel. Provisions for safely handling spent solids containing noble metal are of particular concern, since the spent solid may be retained and processed for noble metal recovery. Inappropriate handling of spent solid that is contaminated with ionic liquid may result in personnel exposure to HCl and possible corrosion of metals recovery plant equipment.

Accordingly, we propose a reactor shutdown process for safely treating spent solids for disposal thereof and/or for metal recovery therefrom, wherein the contaminating ionic liquid may be hydrolyzed in situ to provide an acidic liquid in the reactor, the acidic liquid removed from the reactor, and the acidic liquid neutralized.

Reactor shutdown processes as disclosed herein have the advantages of providing safe, fast, and efficient disposal of spent solid contaminated with ionic liquid. Such processes have the further advantage of providing noble metal recovery from spent solids that contain noble metal. Moreover, such processes have the additional advantage of safeguarding personnel and equipment during reactor shutdown.

I. Acidic Ionic Liquids

Acidic ionic liquids can be used as catalysts for various types of hydrocarbon conversions. Examples of these hydrocarbon conversions include: alkylation, isomerization, hydrocracking, polymerization, dimerization, oligomerization, acylation, metathesis, copolymerization, hydroformylation, dehalogenation, dehydration, and combinations thereof. In one embodiment the hydrocarbon conversion is alkylation of paraffins with olefins. Examples of ionic liquid catalysts and their use for alkylation of paraffins with olefins are taught, for example, in U.S. Pat. Nos. 7,432,408, 7,432,409, 7,285,698, and 7,923,593. In another embodiment the hydrocarbon conversion is alkylation of aromatics. In one embodiment, the acidic ionic liquid is a composite ionic liquid catalyst, wherein the cations come from a hydrohalide of an alkyl containing amine or pyridine, and the anions are composite coordinate anions coming from one or more metal compounds.

The most common acidic ionic liquids are those prepared from organic-based cations and inorganic or organic anions. Ionic liquid catalysts are used in a wide variety of reactions, including Friedel-Crafts reactions. The acidic ionic liquid may be composed of at least two components which form a complex. The acidic ionic liquid comprises a first component and a second component. The first component of the acidic ionic liquid will typically comprise a Lewis acid compound selected from components such as Lewis acid compounds of Group 13 metals, including aluminum halides, alkyl aluminum dihalides, gallium halide, and alkyl gallium halide (see International Union of Pure and Applied Chemistry (IUPAC), version 3, October 2005, for Group 13 metals of the periodic table). Other Lewis acid compounds besides those of Group 13 metals may also be used.

In one embodiment the first component is aluminum halide or alkyl aluminum dihalide. For example, aluminum trichloride ($AlCl_3$), aluminum tribromide ($AlBr_3$), or gallium trichloride ($GaCl_3$) may be used as the first component for preparing the ionic liquid catalyst. In one embodiment, the alkyl aluminum dihalides that can be used can have the general formula $Al_2X_4R_2$, where each X represents a halogen, selected for example from chlorine and bromine, and each R represents a hydrocarbyl group comprising 1 to 12 atoms of carbon, aromatic or aliphatic, with a branched or a linear chain. Examples of alkyl aluminum dihalides include dichloromethylaluminum, dibromomethylaluminum, dichloroethylaluminum, dibromoethylaluminum, dichloro n-hexylaluminum, and dichloroisobutylaluminum, either used separately or combined.

The second component making up the acidic ionic liquid is an organic salt or mixture of salts. These salts may be characterized by the general formula Q+A−, wherein Q+ is an ammonium, phosphonium, boronium, oxonium, iodonium, or sulfonium cation and A- is a negatively charged ion such as $Cl^-$, $Br^-$, $ClO_4^-$, $NO_3^-$, $BF_4^-$, $BCl_4^-$, $PF_6^-$, $SbF_6^-$, $AlCl_4^-$, $Al_2Cl_7^-$, $Al_3Cl_{10}^-$, $GaCl_4^-$, $Ga_2Cl_7^-$, $Ga_3Cl_{10}^-$, $AsF_6^-$, $TaF_6^-$, $CuCl_2^-$, $FeCl_3^-$, $AlBr_4^-$, $Al_2Br_7^-$, $Al_3Br_{10}^-$, $SO_3CF_3^-$, and 3-sulfurtrioxyphenyl. In one embodiment the second component is selected from those having quaternary ammonium halides containing one or more alkyl moieties having from about 1 to about 9 carbon atoms, such as, for example, trimethylammonium hydrochloride, methyltributylammonium, 1-butyl pyridinium, or alkyl substituted imidazolium halides, such as for example, 1-ethyl-3-methylimidazolium chloride.

In one embodiment, the acidic ionic liquid comprises an unsubstituted or partly alkylated ammonium ion. In one embodiment, the acidic ionic liquid is a chloroaluminate or a bromoaluminate. In one embodiment the acidic ionic liquid is a quaternary ammonium chloroaluminate ionic liquid having the general formula $RR'R''NR'''^+Al_2Cl_7^-$, wherein R, R', R'' and R''' are alkyl groups containing 1 to 12 carbons or hydrogen. Examples of quaternary ammonium chloroaluminate ionic liquids are an N-alkylpyridinium chloroaluminate, an N-alkyl-alkylpyridinium chloroaluminate, a pyridinium hydrogen chloroaluminate, an alkyl pyridinium hydrogen chloroaluminate, a dialkylimidazolium chloroaluminate, a tetraalkylammonium chloroaluminate, a trialkylammonium hydrogen chloroaluminate, or a mixture thereof.

The presence of the first component should give the acidic ionic liquid a Lewis or Franklin acidic character. Generally, the greater the mole ratio of the first component to the second component, the greater is the acidity of the acidic ionic liquid.

For example, a typical reaction mixture to prepare n-butyl pyridinium chloroaluminate ionic liquid is shown below:

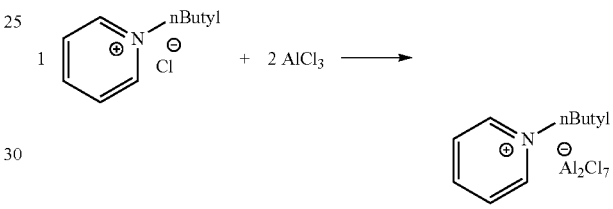

In one embodiment, the acidic ionic liquid comprises a monovalent cation selected from the group consisting of a pyridinium ion, an imidazolium ion, a pyridazinium ion, a pyrazolium ion, an imidazolinium ion, an imidazolidinium ion, a phosphonium ion, and mixtures thereof.

In one embodiment, the hydrocarbon conversion utilizes a co-catalyst to provide enhanced or improved catalytic activity. A co-catalyst can comprise, for example, anhydrous HCl or organic chloride (see, e.g., U.S. Pat. No. 7,495,144 to Elomari, U.S. Pat. No. 7,531,707 to Harris et al., and U.S. Pat. No. 8,674,159 to Hommeltoft). When organic chloride is used as the co-catalyst with the acidic ionic liquid, HCl may be formed in situ in the apparatus either during the hydrocarbon conversion process or during post-processing of the output of the hydrocarbon conversion.

II. Used Ionic Liquid Catalyst

After using an ionic liquid catalyst for catalyzing various hydrocarbon conversion reactions, the ionic liquid catalyst may become deactivated (i.e., having decreased catalytic activity) and may be referred to herein as "used ionic liquid catalyst." Such deactivation can be caused by, for example, the build-up of various impurities in the ionic liquid catalyst. Used ionic liquid catalyst may be regenerated to restore the catalytic activity of the ionic liquid catalyst. In an embodiment, the used ionic liquid catalyst may comprise a chloroaluminate ionic liquid catalyst that has become contaminated with a material such as conjunct polymer.

III. Regeneration Reactors

The expression "reactor" may be used herein to refer to a regeneration reactor for regenerating ionic liquid catalyst. Such reactors may include any apparatus or equipment using a solid catalyst or a solid adsorbent to restore the catalytic activity of used ionic liquid catalyst. As a non-limiting example, in an embodiment the reactor may comprise a vessel containing a bed of solid adsorbent for selectively removing impurities from the used ionic liquid catalyst. In another embodiment, the reactor may comprise a fixed bed reactor using a solid catalyst with or without a guard bed, wherein the guard bed may also have a solid adsorbent for selectively removing impurities from used ionic liquid catalyst. After an extended period of time, the solid catalyst or solid adsorbent becomes spent and may be referred to herein as "spent solid."

IV. Regeneration of Used Ionic Liquid Catalyst

In an embodiment, used ionic liquid catalyst may be regenerated in a (regeneration) reactor using a solid (regeneration) catalyst. In an embodiment, the used ionic liquid catalyst may be contacted with the solid catalyst in the presence of $H_2$ gas to reactivate the used ionic liquid catalyst. A fixed bed reactor for ionic liquid catalyst regeneration may comprise one or more beds. The regeneration of ionic liquid catalyst using solid catalyst is disclosed, for example, in U.S. Pat. Nos. 7,691,771, 7,651,970, 7,678,727, 7,825,055, and in US Patent Pub. Nos. 20140037512A1, 20140039231A1, 20140066678A1, 201400134065A1, and 20140179977A1.

A solid catalyst for ionic liquid regeneration may comprise one or more noble metals on a support. In addition to the noble metal(s) (platinum-group metal(s)), other metal (e.g., Fe, Co, Ni, Cr, Mn, Ti, V, Zr, Mo, W) or non-metal (e.g., Te, As, Sn, S) hydrogenation components may be present in the solid catalyst. The support can include, e.g., kieselguhr, alumina, silica, and silica-alumina, and the like. In an embodiment, the support is porous and may comprise, e.g., a natural clay or a synthetic oxide. The support can be selected to provide adequate mechanical strength and chemical stability under the regeneration conditions.

Alternatively, or in addition to the use of a solid catalyst for ionic liquid catalyst regeneration, used ionic liquid catalyst may be fed to a regeneration reactor comprising a solid adsorbent for removing impurities from the used ionic liquid catalyst and for reactivating the ionic liquid catalyst. The used ionic liquid catalyst may be contacted with the adsorbent under conditions such that impurities, e.g., corrosion products, metal scales, coke deposits, and the like, are adsorbed or otherwise sequestered by the adsorbent and removed from the ionic liquid catalyst. The adsorbent may be selective, such that impurities are selectively removed, while the ionic liquid catalyst flows through the absorbent to provide regenerated ionic liquid catalyst by purifying the ionic liquid catalyst. The term "regenerating" may be used herein to include reactivating used ionic liquid catalyst by removing impurities, including solid particles, from the ionic liquid catalyst.

A solid adsorbent for purifying or regenerating used ionic liquid catalyst may comprise a material selected from a molecular sieve, a refractory oxide, an activated carbon, or combinations thereof. In an embodiment, the adsorbent may comprise a refractory oxide, e.g., selected from alumina, silica, titania, silica-alumina, and zirconia, or the like, and combinations thereof. In an embodiment, the adsorbent may comprise a molecular sieve, including 8-, 10-, 12-, 14- and 16-ring zeolites, and combinations thereof, wherein the zeolites may have a Si/Al ratio in the range from 1 to 50,000. Some non-limiting examples of molecular sieves that may be used as adsorbents for regenerating used ionic liquid catalyst include the following: 3A, 4A, 5A, 13X, 13Y, USY, ZSM-5, ZSM-22, ZSM-23, ZSM-35, ZSM-48, MCM-22, MCM-35, MCM-41, MCM-58, SAPO-5, SAPO-11, SAPO-35, and VPI-5. Zeolites and molecular sieves are well known in the art (see, for example, *Zeolites in Industrial Separation and Catalysis*, By Santi Kulprathipanja, Pub. Wiley-VCH, 2010).

The solid catalyst or solid adsorbent used for regenerating or purifying used ionic liquid catalyst eventually becomes spent and must be periodically unloaded from the reactor. The expression "spent solid" may be used herein to refer to a used solid material that may be contaminated with ionic liquid; examples of spent solid include ionic liquid contaminated solid catalyst and ionic liquid contaminated solid adsorbent. In an embodiment, the spent solid may be in the form of extruded pellets.

V. Regeneration Reactor Shutdown Processes

A reactor for regenerating used ionic liquid may contain a solid catalyst or a solid adsorbent. During an operation mode of the reactor the feed to the reactor may comprise used ionic liquid catalyst. In an embodiment, during the operation mode the feed to the reactor may comprise the ionic liquid phase of the effluent from an ionic liquid catalyzed hydrocarbon conversion zone (see, e.g., FIG. 1). After an extended period of time, the solid catalyst or solid adsorbent within the reactor becomes spent and may be referred to herein as "spent solid." The reactor may be shut down for removal and disposal of the spent solid during a shutdown mode of the reactor. Prior to the removal and disposal of the spent solid, the feed (e.g., used ionic liquid catalyst) to the reactor may be shut off. After the feed to the reactor has been shut off, the removal of the spent solid from the reactor may proceed according to various phases of the reactor shutdown process, as described hereinbelow.

i) Cooling the Regeneration Reactor

A shutdown process as disclosed herein may include a reactor cooling phase for cooling the reactor, if- or as necessary, e.g., following an operation mode of the reactor. The amount of any reactor cooling during the reactor cooling phase of the shutdown process may depend, inter alia, on the reactor operating temperature during the operation mode. The reactor operating temperature (operation mode) may be generally in the range from −60° F. to 800° F., or from 300° F. to 700° F.

During the reactor cooling phase, the reactor may be cooled by circulating a fluid through the reactor. In an embodiment, the fluid may comprise a gas selected from $H_2$ gas, $N_2$ gas, and combinations thereof. In another embodiment, the fluid circulating through the reactor for cooling the reactor may comprise ionic liquid. In a sub-embodiment, the fluid circulating through the reactor for cooling the reactor may comprise a chloroaluminate ionic liquid catalyst capable of catalyzing hydrocarbon conversion reactions. Cooling of the reactor as a result of the reactor cooling phase may be referred to herein as "primary reactor cooling."

During the reactor cooling phase, the reactor temperature may be monitored at a plurality of reactor locations, e.g., at a plurality of locations on the reactor skin (exterior surface). In an embodiment, the reactor may be cooled during the reactor cooling phase to a first threshold reactor temperature. The "first threshold reactor temperature" may be defined as a reactor temperature at which the reactor cooling phase terminates, or may be terminated, without delaying the shutdown process and while safeguarding personnel and equipment. As an example, cooling the reactor to the first threshold reactor temperature will allow the removal of free ionic liquid from the reactor without risking thermal damage to downstream equipment. In an embodiment, an upper limit for the first threshold reactor temperature may be at, or near, a maximum temperature tolerated by the downstream equipment. In general, terminating the reactor cooling phase at higher temperatures may expedite the shutdown process. The first threshold reactor temperature will generally be greater than (>) 200° F. (>93° C.). In an embodiment, the first threshold reactor temperature may be in the range from 225° F. to 400° F. (107° C. to 204° C.), or from 250° F. to 375° F. (121° C. to 190° C.), or from 250° F. to 350° F. (121° C. to 177° C.).

Unless otherwise specified, reference herein to "reactor temperature" refers to the highest temperature recorded at a given time point by a plurality of temperature indicators, wherein each temperature indicator is configured for independently monitoring the temperature of the reactor skin at a corresponding plurality of reactor skin locations. In an embodiment, the reactor cooling phase may comprise cooling the reactor at a controlled reactor cooling rate so as to prevent equipment damage. In an embodiment, the reactor may be depressured after the reactor cooling phase of the shutdown process, e.g., to a reactor pressure in the range from ambient pressure to 50 psi. In another embodiment, the reactor may be depressured after (optionally) stripping residual hydrocarbons from the spent solid, infra.

ii) Removing Free Ionic Liquid from the Regeneration Reactor

After the feed to the reactor has been shut off, the reactor may contain the spent solid and an ionic liquid. At least a first portion of the ionic liquid may be removed from the reactor prior to introducing water into the reactor. In an embodiment, a first portion of the ionic liquid to be removed from the reactor may comprise free ionic liquid. The expression "free ionic liquid" may be used herein to refer to ionic liquid that is neither adsorbed nor adsorbed by the spent solid. In an embodiment, the removal of free ionic liquid from the reactor may be performed after the reactor has been cooled via the reactor cooling phase.

In an embodiment, the free ionic liquid may be removed from the reactor by draining the free ionic liquid from the reactor, e.g., under gravity. In an embodiment, after draining the free ionic liquid a small amount of the free ionic liquid may remain in the reactor. In an embodiment, draining the free ionic liquid from the reactor may remove typically at least 90%, or at least 95%, or at least 98% of the total volume of the free ionic liquid from the reactor. In an embodiment, the ionic liquid may comprise a used chloroaluminate ionic liquid catalyst.

iii) Removing Adsorbed Ionic Liquid from the Spent Solid

After removing at least a portion of the free ionic liquid from the reactor, the spent solid in the reactor may be contaminated with adsorbed ionic liquid, as well as absorbed ionic liquid and any remaining free ionic liquid. The process for unloading the spent solid from the reactor may further comprise removing the adsorbed ionic liquid from the spent solid. The expression "adsorbed ionic liquid" may be used herein to refer to ionic liquid that is adsorbed by the spent solid and that remains on the surface of the spent solid after removing the free ionic liquid from the reactor. In an embodiment, the spent solid may comprise a solid catalyst or a solid adsorbent.

In an embodiment, at least a portion of the adsorbed ionic liquid may be removed from the spent solid by stripping with a gas stream or a liquid stream. Stripping the spent solid with a gas- or liquid stream may also remove at least a portion of any remaining free ionic liquid. Stripping the spent solid with a gas- or liquid stream may further remove some of the ionic liquid that is absorbed by the spent solid, e.g., disposed within the pores or void spaces of the spent solid. The flow of the gas stream or the liquid stream may be up-flow or down-flow through one or more beds of the spent solid (see, e.g., FIGS. 2A-2B).

A gas stream for stripping adsorbed-, free-, or absorbed ionic liquid from the spent solid may be selected from $N_2$ gas, or $H_2$ gas, or a combination thereof. A liquid stream for removing the adsorbed ionic liquid from the spent solid may be a hydrocarbon solvent, such as a refinery light hydrocarbon feed or product, or a purchased solvent. In an embodiment, the removal of adsorbed ionic liquid from the spent solid may be performed at elevated pressure, e.g., sufficient to keep the hydrocarbon solvent in the liquid phase.

After the removal of adsorbed ionic liquid from the spent solid, the shutdown process may further comprise removing at least one additional material from the reactor, e.g., by circulating a gaseous medium through the reactor during the hydrocarbon stripping and/or reactor purging phases (infra), wherein such material may be selected from residual hydrocarbons, $H_2$ gas, HCl gas, a hydrocarbon solvent, and combinations thereof. Such material(s) may be removed from the reactor prior to the water introducing phase, infra.

iv) Stripping Residual Hydrocarbons from the Spent Solid

The shutdown process may optionally further comprise a hydrocarbon stripping phase for removing residual hydrocarbons from the spent solid. Such residual hydrocarbons may be derived from the feed to the (regeneration) reactor during a reactor operation mode, or from a hydrocarbon solvent used for stripping adsorbed ionic liquid from the spent solid during shutdown mode. The hydrocarbon stripping phase, if any, may be conducted at an elevated temperature and/or elevated pressure, e.g., to decrease the required stripping time. In an embodiment, hydrocarbon stripping may be conducted at a temperature typically in the range from 200° F. to 400° F. In an embodiment, the hydrocarbon stripping may be conducted at a pressure typically in the range from ambient pressure (0 psig) to 200 psig.

In an embodiment, hydrocarbons may be stripped from the spent solid with circulating $H_2$ gas and/or $N_2$ gas. In an embodiment, after the hydrocarbon stripping phase of the shutdown process the reactor may be depressured, e.g., to ≤50 psi. The reactor effluent (circulating $H_2$ gas and/or $N_2$ gas) may be monitored for the presence of HCl gas and/or hydrocarbons during, and/or after, the hydrocarbon stripping phase, e.g., when the reactor is depressured.

v) Purging the Regeneration Reactor

After removing the adsorbed ionic liquid from the spent solid, and after any (optional) hydrocarbon stripping of the spent solid, the shutdown process may further comprise a reactor purging phase. During the reactor purging phase the reactor may be purged with $N_2$ gas, e.g., to remove $H_2$ gas, HCl gas, and light hydrocarbon gases from the reactor and to place the reactor under inert conditions. After purging the reactor with $N_2$ gas, the spent solid will typically still contain some residual ionic liquid, e.g., ionic liquid that is absorbed by the spent solid and that resides within pores and void spaces of the spent solid. In an embodiment, the reactor may be depressured before the purging phase. Alternatively, the reactor may be depressured after the purging phase.

At the termination of the purging phase, the shutdown process may further comprise quantifying the hydrocarbon content of the effluent (e.g., comprising primarily $N_2$ gas) discharged from the reactor; and, based on the hydrocarbon content, determining a lower explosive limit (LEL) for the reactor effluent. The reactor effluent may similarly be monitored for the presence of HCl gas.

During the purging phase and certain earlier phases of the shutdown process, the reactor may undergo secondary cooling in addition to (i.e., after) that of the reactor cooling phase. In an embodiment, the reactor cooling phase may be terminated at a selected reactor temperature such that by the time the purging phase is complete, the reactor may typically be at, or near, a second threshold reactor temperature. The "second threshold reactor temperature" may be defined herein as a reactor temperature at which the water introducing phase of the shutdown process may be commenced while safeguarding personnel and equipment. The second threshold reactor temperature may be lower than (<) the first threshold reactor temperature. In an embodiment, the second threshold reactor temperature may be not greater than (≤) 250° F., or not greater than (≤) 200° F. In a sub-embodiment, the second threshold reactor temperature may typically be in the range from 195° F. to 240° F. (about 91° C. to 115° C.), or from 198° F. to 200° F. (about 92° C. to 93° C.).

By estimating the degree of secondary reactor cooling taking place during the shutdown process up to and including the purging phase, shutdown processes as disclosed herein allow the reactor cooling phase to be terminated at a reactor temperature substantially above the second threshold reactor temperature, thereby shortening the shutdown duration. For example, by terminating the reactor cooling phase at a temperature in the range from 250° F. to 400° F., the shutdown process may be expedited.

vi) Hydrating the Spent Solid with $H_2O$ Vapor

In an embodiment, the shutdown process may optionally further comprise a "spent solid hydration" phase using $H_2O$ vapor. The spent solid hydration phase, if any, may comprise contacting the spent solid, in situ, with a gaseous medium comprising $H_2O$ vapor, wherein the spent solid contains residual ionic liquid. For example, a gaseous medium comprising $H_2O$ vapor may be introduced into the reactor such that the $H_2O$ vapor may hydrate the spent solid sufficient to hydrolyze at least a portion of the residual ionic liquid contained by the spent solid. The spent solid hydration phase, if any, may be performed prior to the water introducing phase, infra. In an embodiment, a gaseous medium comprising $H_2O$ vapor for use in hydrating the spent solid may be selected from low pressure steam, moist $N_2$ gas, and combinations thereof.

While not being bound by theory, the residual ionic liquid within the spent solid may be water-reactive and may generate heat following contact with water. Heat generated when the contaminated spent solid contacts liquid water could promote fragmentation of the spent solid, which may complicate dumping, separation, or other handling of the spent solid during the reactor shutdown and spent solid disposal process. The use of $H_2O$ vapor to hydrate the spent solid, prior to the water introducing phase, may provide a more "gentle" hydrolysis of residual ionic liquid so as to mitigate any thermally induced fragmentation of the spent solid.

In an embodiment, the migration of an exotherm through one or more beds of the spent solid may, optionally, be tracked during the spent solid hydration phase as the residual ionic liquid within the spent solid is hydrolyzed. Tracking the exotherm migration through the spent solid bed(s) may be used to monitor the progress of spent solid hydration and thus serve as a guide for proceeding with the shutdown process.

vii) Introducing Water into the Regeneration Reactor

A water introducing phase of the shutdown process may be commenced after purging the reactor and when the reactor is at a second threshold reactor temperature. The water introducing phase may comprise introducing liquid water into the reactor, wherein the reactor contains the spent solid such that the water contacts the spent solid. After the removal of adsorbed ionic liquid (supra), the spent solid may still retain residual ionic liquid. The expression "residual ionic liquid" may be used herein to refer to ionic liquid that is retained by the reactor and/or the spent solid, e.g., by absorption within pores and void spaces of the spent solid, after the removal of at least a portion of both free ionic liquid and adsorbed ionic liquid.

During the water introducing phase, the water may contact the residual ionic liquid to form an acidic liquid in the reactor. In an embodiment, a minor or trace amount of free ionic liquid and/or adsorbed ionic liquid may remain in the reactor at the start of the water introducing phase. During the water introducing phase, any such free- and/or adsorbed ionic liquid may be contacted with the water, together with the residual ionic liquid, to form the acidic liquid in the reactor.

In an embodiment, the water introducing phase may comprise flooding the reactor with the water. The term "flooding" may be used herein to refer to introducing water into a regeneration reactor to at least partially fill the reactor with water. The reactor may have one or more fixed beds of the spent solid. During reactor flooding, at least one bed of the spent solid within the reactor may be submerged by the water, and typically all of the beds within the reactor may be submerged by the water. In an embodiment, the water introducing phase may comprise introducing the water into the reactor from the bottom of the reactor. In another embodiment, e.g., wherein the reactor has a sparger, the water introducing phase may comprise introducing the water into the reactor from the top of the reactor.

After the reactor has been flooded as a result of the water introducing phase, the acidic liquid thus formed in the reactor may be recirculated through the reactor. In an embodiment, the pH of the circulating acidic liquid may be monitored, e.g., as an indicator of ionic liquid hydrolysis within the reactor. In an embodiment, the bed(s) of spent solid within the reactor may remain at least substantially intact during the water introducing phase, including recirculation of acidic liquid through the reactor.

In an embodiment, the acidic liquid in the reactor after the water introducing phase may have a pH in the range from 0 to 3. The formation of any $Al(OH)_3$ colloidal gel is minimized, and insufficient to interfere with unloading the reactor or handling the spent solid, within this pH range (0-3). In an embodiment, the residual ionic liquid contacted with water during the water introducing phase may comprise a used chloroaluminate ionic liquid catalyst. In an embodiment, the acidic liquid in the reactor after the water introducing phase may comprise an aqueous solution of HCl.

In an embodiment, the water introducing phase may comprise introducing the water into the reactor at a controlled reactor fill rate, e.g., according to the diameter of the reactor. In an embodiment, the reactor fill rate may be in the range from 1 to 10 volumes of water/volume of spent solid per hour (v/v/hr or LHSV), or from 2 to 5 v/v/hr (LHSV). In an embodiment, the reactor fill volume with water may be in the range from 1 to 10 volumes of water/volume of spent solid (v/v), or from 2 to 5 v/v. In an embodiment, the water introduced into the reactor may have a chloride content not greater than 100 ppm, or not greater than 50 ppm, and such water may be otherwise free of contaminants that could damage the reactor or other equipment involved in the shutdown process.

In an embodiment, the water introduced into the reactor during the water introducing phase may be at a temperature not less than (≥) 50° F. (10° C.), or within the range from 50°

F. to 150° F. (10° C. to 66° C.), or from 50° F. to 100° F. (10° C. to 38° C.). In an embodiment, the water introduced into the reactor may be at ambient temperature and ambient pressure. In an embodiment, the water introduced into the reactor during the water introducing phase may be selected from condensed water, industrial water, treated water, reverse osmosis water, potable water, and combinations thereof. In an embodiment, the water introducing phase of the shutdown process may also serve to further cool the reactor to a temperature suitable for dumping the spent solid and acidic liquid from the reactor (infra).

During phases of the shutdown process when either liquid water or water vapor may be introduced into the reactor, the presence of HCl gas may be monitored. The possible presence of HCl gas may also be monitored during other phases of the shutdown process, including, for example, during depressuring and purging the reactor (supra) as well as during the dumping phase (infra).

viii) Dumping Acidic Liquid and Spent Solid from the Regeneration Reactor

After the reactor has been at least partially filled with water (e.g., flooded) and the reactor contains acidic liquid, the shutdown process may further comprise dumping the spent solid and the acidic liquid from the reactor. In an embodiment, the spent solid and the acidic liquid may be dumped from the bottom of the reactor under gravity, e.g., via a reactor dump pipe, into one or more dump containers. In an embodiment, the shutdown process may further comprise injecting water into the reactor from the top of the reactor during the dumping phase. Such injection of water into the top of the reactor, while spent solid and acidic liquid are being dumped from the bottom of the reactor, may serve to effectively flush any remaining spent solid and acidic liquid from the reactor.

ix) Providing Neutralized Liquid

In an embodiment, the shutdown process may further comprise neutralizing the acidic liquid to provide a neutralized liquid. The acidic liquid that has been removed, e.g., dumped, from the reactor may be referred to herein as "dumped acidic liquid." In an embodiment, the spent solid and the acidic liquid may be dumped into a basic liquid to provide a neutralized liquid in admixture with the spent solid, and the process may further comprise separating the spent solid from the neutralized liquid.

In an embodiment, the spent solid and the acidic liquid may be dumped into at least one dump container. In an embodiment, each dump container may comprise a roll-off bin, or the like. In practice, a plurality of dump containers may be used sequentially to unload a single reactor. Each dump container may contain a basic liquid having a certain volume and basicity so as to provide a neutralized liquid having a pH within a desired range when an aliquot of the acidic liquid is dumped into the dump container. In an embodiment, the neutralized liquid may have a pH in the range from pH 6 to 10, or from pH 7 to 9. In a sub-embodiment, the spent solid and the acidic liquid may be dumped into (aqueous) NaOH or KOH solution to provide a neutralized aqueous liquid comprising NaCl. Such NaOH solution may typically have a concentration not greater than ($\leq$) 6 M. The basic liquid is not limited to NaOH solution or any particular base.

x) Separating the Spent Solid from the Neutralized Liquid

The spent solid may be rapidly and efficiently separated from the neutralized liquid using various techniques, including separation via a mesh or screen of different configurations using, e.g., gravity or suction to remove the neutralized liquid from the spent solid (see, e.g., commonly assigned US Patent Pub. No. 2014/0299558A1). Separation of the spent solid from the neutralized liquid may be performed during or after the dumping phase, supra. In an embodiment, the separated neutralized liquid may be mixed to provide a homogeneous neutralized liquid. Such mixing may be achieved by circulating the neutralized liquid, e.g., via a pump, within a suitable vessel for containing the neutralized liquid. In an embodiment, the neutralized liquid may be stored temporarily or sent to a refinery waste water system.

xi) Recovery of Noble Metal from Spent Solid

In an embodiment, the spent solid may comprise a noble metal and the process may further comprise recovering at least one noble metal from the spent solid. The recovery of noble metal(s) from the spent solid may be conducted after the spent solid has been separated from the neutralized liquid. Processes that may be used for such metal recovery are disclosed, for example, in U.S. patent application Ser. No. 14/521,195 Process for preparing a spent catalyst for precious metal recovery, filed Oct. 22, 2014.

xii) Filtration of Neutralized Liquid

In an embodiment, the spent solid may comprise a noble metal, and the neutralized liquid may contain fines of the spent solid. The process may further comprise, after separation of the spent solid from the neutralized liquid, filtering the neutralized liquid to recover fines of the spent solid from the neutralized liquid, and thereafter, recovering noble metal from the fines. In an embodiment, filtering the neutralized liquid to recover fines of the spent solid may involve the use of various filtration methods, filtration media, and filter aids. Filtration methods, filtration media, and filter aids, as well as processes for precious metal recovery, are disclosed, for example, in U.S. patent application Ser. No. 14/521,195, Process for preparing a spent catalyst for precious metal recovery, filed Oct. 22, 2014.

Embodiments of the invention will now be further described with reference to the drawings. FIG. 1 schematically represents a regeneration reactor ("reactor 300") in relation to an ionic liquid catalyzed hydrocarbon conversion process. A hydrocarbon feed 10, with or without fresh ionic liquid catalyst 20, may be fed to a hydrocarbon conversion zone 100 for an ionic liquid catalyzed hydrocarbon conversion reaction. The effluent 30 from hydrocarbon conversion zone 100 may be fed to a separation unit 200 for separating effluent 30 into a hydrocarbon phase 40 and an ionic liquid phase 50. The hydrocarbon phase 40 may be fractionated e.g., via a distillation unit (not shown), to provide one or more products. In an embodiment, hydrocarbon conversion zone 100 may comprises an alkylation reactor for ionic liquid catalyzed alkylation reactions, hydrocarbon feed 10 may comprise at least one olefin +/− at least one isoparaffin, separation unit 200 may comprise a coalescer, and hydrocarbon phase 40 may comprise an alkylate product, e.g., alkylate gasoline.

With further reference to FIG. 1, a first portion 50a of the ionic liquid phase may be recycled to hydrocarbon conversion zone 100. In an embodiment, ionic liquid phase 50 may comprise used ionic liquid catalyst. A second portion 50b of the ionic liquid phase may be fed to reactor 300 for regenerating the used ionic liquid catalyst to provide regenerated ionic liquid catalyst 60. Regenerated ionic liquid catalyst 60 may be recycled to hydrocarbon conversion zone 100 or may be stored for subsequent use. Reactor 300 may contain at least one bed of solid catalyst or solid adsorbent suitable for regenerating used ionic liquid catalyst. After operation of reactor 300, e.g., for an extended period of time, the solid catalyst or solid adsorbent becomes spent and may be referred to herein as spent solid. Reactor 300 may be shut down for removal and disposal of the spent solid according to shutdown processes, as described hereinabove.

FIGS. 2A and 2B schematically represent fluid flow through a (regeneration) reactor 300 during various phases of a reactor shutdown process. Reactor 300 may include a reactor wall 320 having an exterior surface (or skin) 320'. Reactor 300 may further include a reactor upper cap, or top, 310a and a reactor lower cap, or bottom, 310b. Reactor top 310a and reactor bottom 310b may be referred to herein as the top of the reactor and the bottom of the reactor, respectively.

In an embodiment (see, for example, FIG. 2A), a fluid 330 may be fed to reactor 300 at reactor top 310a, flow downward through bed 340 of the spent solid, and flow from reactor 300 at reactor bottom 310b. In another embodiment (see, for example, FIG. 2B), a fluid 330 may be fed to reactor 300 at reactor bottom 310b, flow upward through bed 340 of the spent solid, and flow from reactor 300 at reactor top 310a. In both embodiments (up-flow and down-flow), fluid flow may be circulated back to reactor 300 via ancillary equipment (not shown), e.g., comprising one or more of a pump, a separator, and a heat exchanger, as is known in the art. Although only one bed 340 is shown in FIGS. 2A and 2B, in an embodiment reactor 300 may contain a plurality of beds.

According to various embodiments and phases of the shutdown process, fluid 330 may comprise: a gas such as $H_2$ gas, $N_2$ gas, a $H_2/N_2$ gas mixture, or a gaseous medium comprising $H_2O$ vapor; or a liquid such as an ionic liquid catalyst or a hydrocarbon solvent. As non-limiting examples, during the reactor cooling and hydrocarbon stripping phases fluid 330 may comprise ionic liquid catalyst, $H_2$ gas, $N_2$ gas, or a $H_2/N_2$ gas mixture; during the purging phase fluid 330 may comprise $N_2$ gas; and during the spent solid hydration phase fluid 330 may comprise a gaseous medium comprising $H_2O$ vapor, such as low pressure steam or moisture saturated $N_2$ gas. Details of fluid flow during the various phases of the shutdown process are described hereinabove.

Figure 3B:
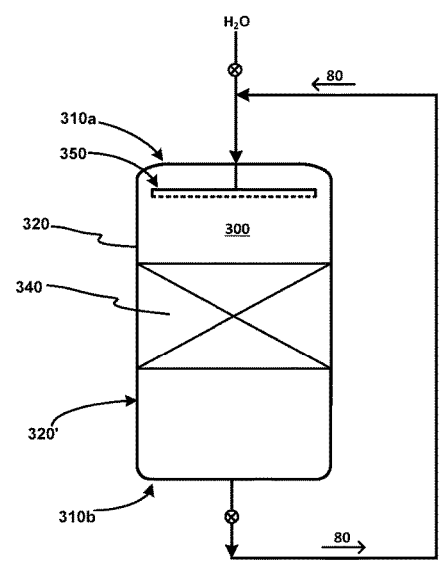

FIGS. 3A and 3B schematically represent the introduction of water into a regeneration reactor ("reactor 300") during a reactor shutdown process. Bed 340 may comprise spent solid containing residual ionic liquid catalyst. The water introduced into the reactor contacts the residual ionic liquid to form an acidic liquid within reactor 300. FIG. 3A shows the introduction of water into reactor 300 via reactor bottom 310b. FIG. 3B shows the introduction of water into reactor 300 via reactor top 310a. In the embodiment of FIG. 3B the water may be introduced into reactor 300 via a sparger 350.

When reactor 300 is at least partially full, acidic liquid 80 may be recirculated through reactor 300, e.g., via a pump (not shown), to ensure that the bed(s) 340 of spent solid have been thoroughly contacted with the acidic liquid.

Figure 4:
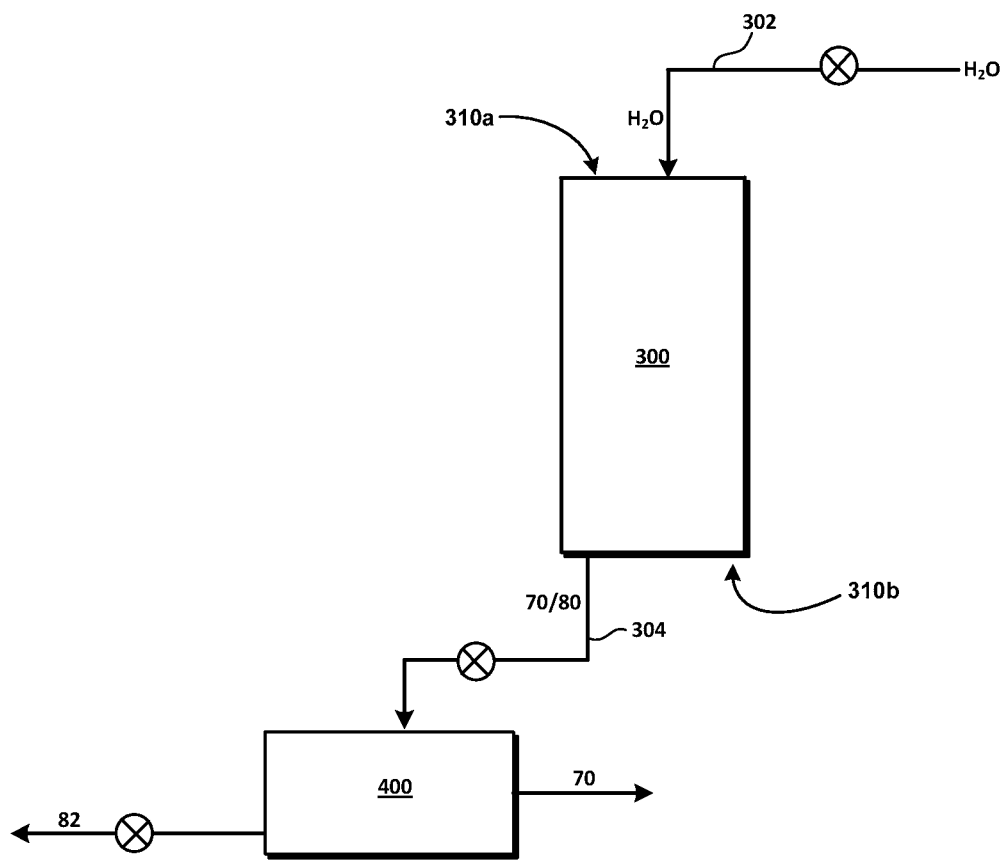
FIG. 4 is a scheme for dumping a spent solid and an acidic liquid from a regeneration reactor and for neutralizing the acidic liquid, according to an embodiment of the invention.

FIG. 4 is a scheme for dumping a spent solid and an acidic liquid from a regeneration reactor ("reactor 300"), and for neutralizing the acidic liquid, during a reactor shutdown process. When the residual ionic liquid within the spent solid has been hydrolyzed, e.g., due to contact with an aqueous medium, spent solid 70 together with acidic liquid 80 may be dumped from reactor 300 via a line 304 into a dump container 400. In an embodiment, concurrently with the dumping of spent solid 70 and acidic liquid 80 from the reactor 300, water may be injected into reactor 300 from the reactor top 310a via a line 302.

Dump container 400 may contain a basic liquid (not shown). In an embodiment, spent solid 70 and acidic liquid 80 may be dumped directly into the basic liquid thereby neutralizing acidic liquid 80 to provide a neutralized liquid 82 in admixture with spent solid 70. Neutralized liquid 82 may be formed following a neutralization reaction involving the acidic- and basic liquids to form a salt (e.g., NaCl) and water. In an embodiment, acidic liquid 80 may have a pH in the range from 0 to 3, while neutralized liquid 82 may have a pH in the range from 6 to 10, or from 7 to 9. In an embodiment, spent solid 70 may be separated from neutralized liquid 82, and each of spent solid 70 and neutralized liquid 82 may be further processed, e.g., as described hereinabove.

For the purposes of this specification and the appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All publications, patents, and patent applications cited in this application are herein incorporated by reference in their entirety to the same extent as if the disclosure of each individual publication, patent application, or patent was specifically and individually indicated to be incorporated by reference in its entirety.

The drawings are representational and may not be drawn to scale. Modifications of the exemplary embodiments disclosed above may be apparent to those skilled in the art in light of this disclosure. Accordingly, the invention is to be construed as including all structure and methods that fall within the scope of the appended claims. Unless otherwise specified, the recitation of a genus of elements, materials or other components, from which an individual component or mixture of components can be selected is intended to include all possible sub-generic combinations of the listed components and mixtures thereof.

What is claimed is:

1. A process for safely unloading a spent solid from a reactor, the process comprising:
   a) introducing water into the reactor, wherein the reactor contains the spent solid and the spent solid contains residual ionic liquid;
   b) contacting the residual ionic liquid with the water to form an acidic liquid in the reactor; and
   c) dumping the spent solid and the acidic liquid from the reactor;
   wherein step c) comprises dumping the spent solid and the acidic liquid into a basic liquid to provide a neutralized liquid in admixture with the spent solid; the process further comprising: i) separating the spent solid from the neutralized liquid; and wherein the spent solid comprises at least one noble metal; and the process further comprises:
   j) after step i), recovering the at least one noble metal from the spent solid.

2. The process according to claim 1, further comprising:
   k) prior to step a), contacting the spent solid with a gaseous medium comprising $H_2O$ vapor.

3. The process according to claim 1, wherein step a) comprises introducing the water into the reactor from the bottom of the reactor.

4. The process according to claim 1, wherein step a) comprises filling the reactor with the water, and the process further comprises:
   l) prior to step c), recirculating the acidic liquid through the reactor.

5. The process according to claim 1, further comprising:
   m) during step c), injecting the water into the reactor from the top of the reactor.

6. The process according to claim 1, wherein the reactor comprises a vessel containing a bed of solid adsorbent.

7. The process according to claim 1, wherein the reactor comprises a fixed bed reactor.

8. The process according to claim 1, wherein the spent solid comprises a solid adsorbent or a solid catalyst.

9. The process according to claim 1, wherein:
   the acidic liquid has a pH in a range from 0 to 3, and
   the neutralized liquid has a higher pH in a higher range from 6 to 10.

10. The process according to claim 1, wherein step a) follows purging the reactor with a gas stream that is a $N_2$ gas, a $H_2$ gas, or a combination thereof.

11. The process according to claim 10, wherein the gas stream is the $N_2$ gas.

12. The process according to claim 1, further comprising:
   d) prior to step a), removing free ionic liquid from the reactor.

13. The process according to claim 12, further comprising:
   e) prior to step d), cooling the reactor to a first threshold reactor temperature.

14. The process according to claim 13, wherein:
   step a) is performed when the reactor is at a second threshold reactor temperature, and
   the second threshold reactor temperature is lower than the first threshold reactor temperature.

15. The process according to claim 14, wherein:
   the first threshold reactor temperature is in a range from 250° F. to 400° F., and
   the second threshold reactor temperature is in a second range from 195° F. to 240° F.

16. The process according to claim 12, wherein after step d) the spent solid is contaminated with adsorbed ionic liquid, and the process further comprises:
   f) prior to step a), removing at least a portion of the adsorbed ionic liquid from the spent solid by stripping the spent solid.

17. The process according to claim 1, further comprising:
   g) prior to step a), removing at least one material from the reactor, wherein the at least one material is selected from the group consisting of residual hydrocarbons, a $H_2$ gas, a HCl gas, a hydrocarbon solvent, and combinations thereof.

18. A process for safely unloading spent solid from a reactor, the process comprising:
   a) cooling the reactor, wherein the reactor contains the spent solid and an ionic liquid;
   b) removing at least a first portion of the ionic liquid from the reactor;
   c) purging the reactor with $N_2$ gas;
   d) introducing water into the reactor, wherein the spent solid contains residual ionic liquid and the water contacts the residual ionic liquid to form an acidic liquid in the reactor;
   e) dumping the spent solid and the acidic liquid from the reactor;
   f) neutralizing the dumped acidic liquid to provide a neutralized liquid; and
   g) separating the spent solid from the neutralized liquid, wherein:
   the ionic liquid comprises a chloroaluminate ionic liquid catalyst, and
   the spent solid comprises a solid adsorbent or a solid catalyst.

19. A process for safely unloading spent solid from a reactor, the process comprising:
   a) cooling the reactor with circulating fluid, wherein the reactor contains the spent solid and free ionic liquid;
   b) after step a), draining the free ionic liquid from the reactor;
   c) after step b), stripping adsorbed ionic liquid from the spent solid;
   d) purging the reactor with $N_2$ gas, wherein after step d) the spent solid contains residual ionic liquid;
   e) after step d), flooding the reactor with water;
   f) via step e), contacting the residual ionic liquid with the water to form an acidic liquid in the reactor;
   g) recirculating the acidic liquid through the reactor;
   h) after step g), dumping the spent solid and the acidic liquid from the reactor into NaOH solution to provide a neutralized liquid in admixture with the spent solid; and
   i) separating the spent solid from the neutralized liquid.

20. The process according to claim 1, claim 18, or claim 19, wherein the reactor has an operating temperature from 150° F. to 800° F.

* * * * *